United States Patent [19]

Shearer, Jr.

[11] 4,411,577
[45] Oct. 25, 1983

[54] VEHICLE SENSOR MONITORING SYSTEM

[75] Inventor: James T. Shearer, Jr., Ada, Mich.

[73] Assignee: Rapistan Division, Lear Siegler, Inc., Grand Rapids, Mich.

[21] Appl. No.: 240,172

[22] Filed: Mar. 3, 1981

Related U.S. Application Data

[63] Continuation-in-part of Ser. No. 128,261, Mar. 7, 1980, Pat. No. 4,331,417.

[51] Int. Cl.³ ............................................. B65G 65/02
[52] U.S. Cl. .................................. 414/274; 340/686; 414/273
[58] Field of Search ............................... 414/273–275; 340/686, 679; 364/426, 478, 551, 552, 550; 371/25

[56] References Cited

U.S. PATENT DOCUMENTS

| | | | |
|---|---|---|---|
| 3,581,915 | 6/1971 | Saul | 414/273 |
| 3,595,412 | 7/1971 | Billingsley et al. | 414/274 X |
| 3,646,890 | 3/1972 | Snyder | 364/426 X |
| 3,734,310 | 5/1973 | Miller | 414/273 |
| 3,850,105 | 11/1974 | Aronstein et al. | 414/274 X |
| 4,165,501 | 8/1979 | Bongort et al. | 340/686 X |
| 4,218,616 | 8/1980 | Loomer | 414/274 X |
| 4,299,496 | 11/1981 | Lord | 340/686 X |
| 4,331,417 | 5/1982 | Shearer et al. | 414/273 |
| 4,337,516 | 6/1982 | Murphy et al. | 364/551 |

Primary Examiner—Robert B. Reeves
Assistant Examiner—Edward M. Wacyra
Attorney, Agent, or Firm—Price, Heneveld, Huizenga & Cooper

[57] ABSTRACT

In a system for controlling the horizontal and vertical alignment of a materials handling vehicle and for transferring articles to and from storage locations of a warehousing system in which several control sensors are positioned on the materials handling vehicle, a monitoring method and circuit for determing the operational status of the sensors by monitoring their status during a selected portion of a cycle of operation when their output is known. In one embodiment sensor outputs are cross checked against each other during a portion of an operating cycle in which the sensors outputs will be at a predetermined relationship to one another.

14 Claims, 14 Drawing Figures

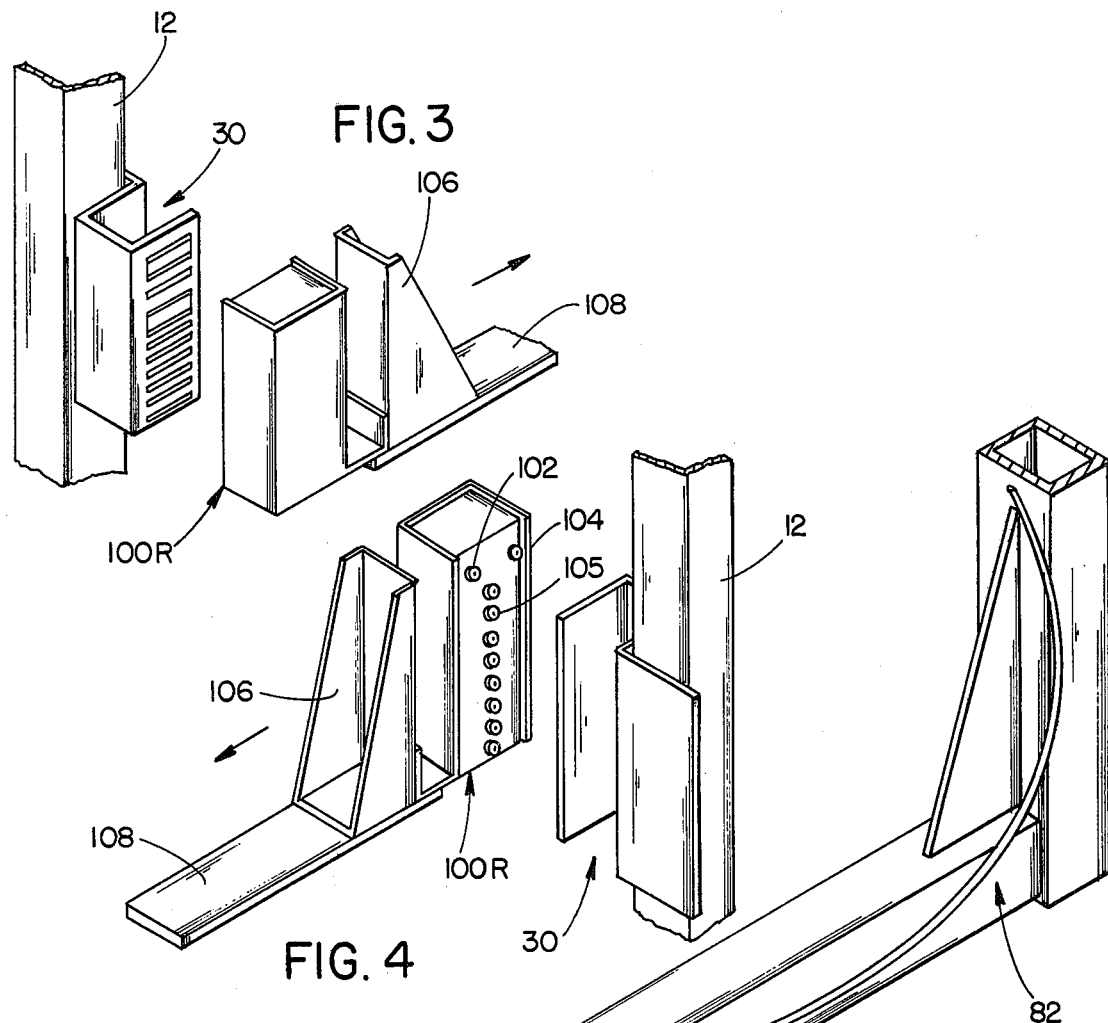
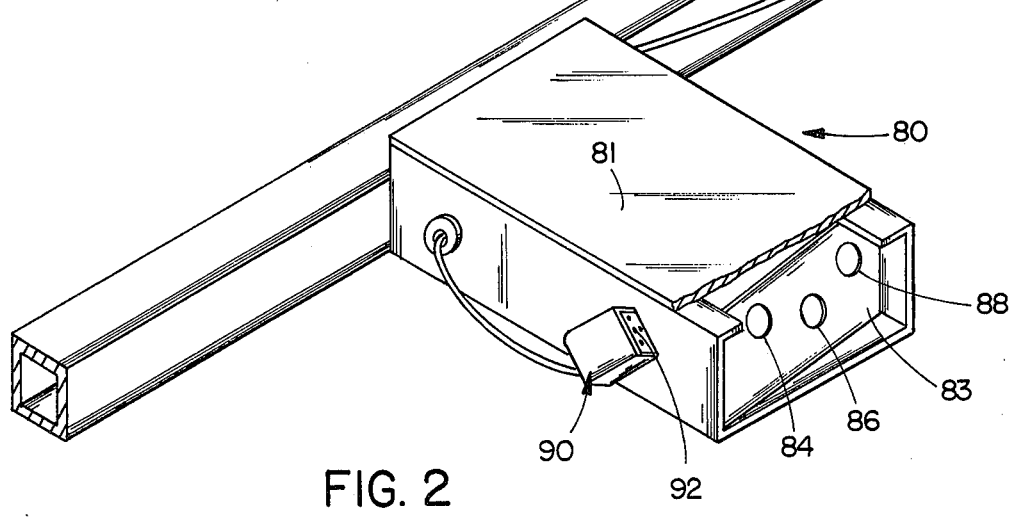

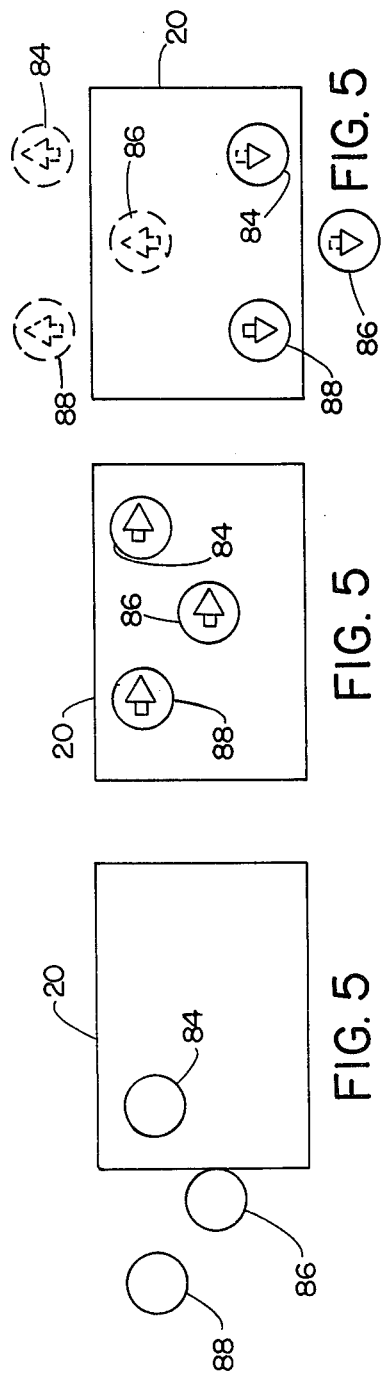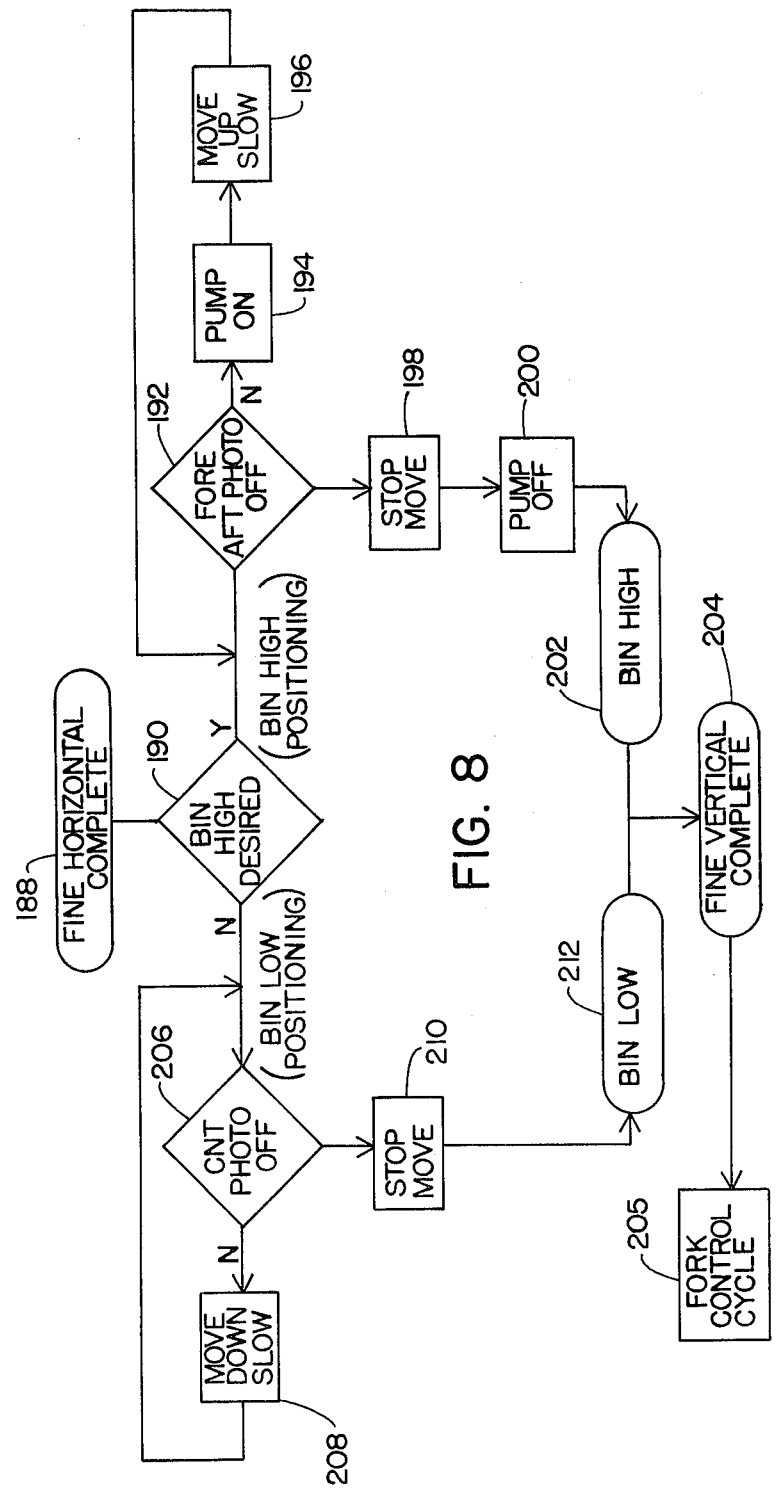

VEHICLE SENSOR MONITORING SYSTEM

CROSS REFERENCE TO RELATED APPLICATIONS

This application is a continuation-in-part of U.S. patent application Ser. No. 128,261, filed Mar. 7, 1980, now U.S. Pat. No. 4,331,417, entitled VEHICLE ALIGNMENT SYSTEM, and assigned to the present assignee.

BACKGROUND OF THE INVENTION

The present invention relates to material handling apparatus and particularly to a system for testing sensors employed to control a load handling vehicle.

In warehousing systems where vehicles are employed for transporting articles and materials into and out of storage locations located in an array of storage bins, a variety of sensors are employed. Such sensors include, for example, encoders which provide pulses, the number of which represent the distance a vehicle has traveled from a reference location, such that by counting the number of pulses, the position of a vehicle can be coarsely estimated, speed tachometers, address readers, and load detecting sensors to name a few.

As vehicle controls become more advanced, a greater number of sensors can be used to accurately control both the positioning and movement of a load handling vehicle. The use of more sensors to provide more sophisticated control of the vehicle however provides a greater opportunity for sensor failure which could, in turn, cause serious vehicle control malfunctions.

SUMMARY OF THE PRESENT INVENTION

The present invention assures fail-safe operation of a vehicle employing several vehicle controlling sensors by providing a method and circuit for monitoring the control sensors during a portion of a load handling cycle which assures a predictable state of operation of each sensor monitored. If the operational state is abnormal, a fault control signal is generated and the vehicle operation either terminated and/or an operator alerting alarm generated. In some embodiments of the invention the operational state of related sensors are selectively cross-checked against each other to ascertain if the sensors are operational.

These and other features, objects and advantages of the present invention will become apparent upon reading the following description thereof with reference to the accompanying drawings in which:

BRIEF DESCRIPTION OF THE DRAWINGS

FIG. 2 is a fragmentary perspective view of the sensing means incorporated in the system of the present invention;

FIG. 3 is a fragmentary front perspective view of an address target and associated sensing means employed in the system of the present invention;

FIG. 4 is a fragmentary rear perspective view of the structure shown in FIG. 3;

FIG. 5A is a pictorial representation showing the interrelationship of the fine positioning sensing means with the associated target means in a first position;

FIG. 5B is a pictorial representation showing the interrelationship of the fine positioning sensing means with the associated target means in a second position;

FIG. 5C is a pictorial representation showing the interrelationship of the fine positioning sensing means with the associated target means in third and fourth positions;

FIG. 8 is a flow diagram of the vertical fine positioning of the materials handling vehicle with respect to a storage location;

DETAILED DESCRIPTION OF THE PREFERRED EMBODIMENT

Figure 1:
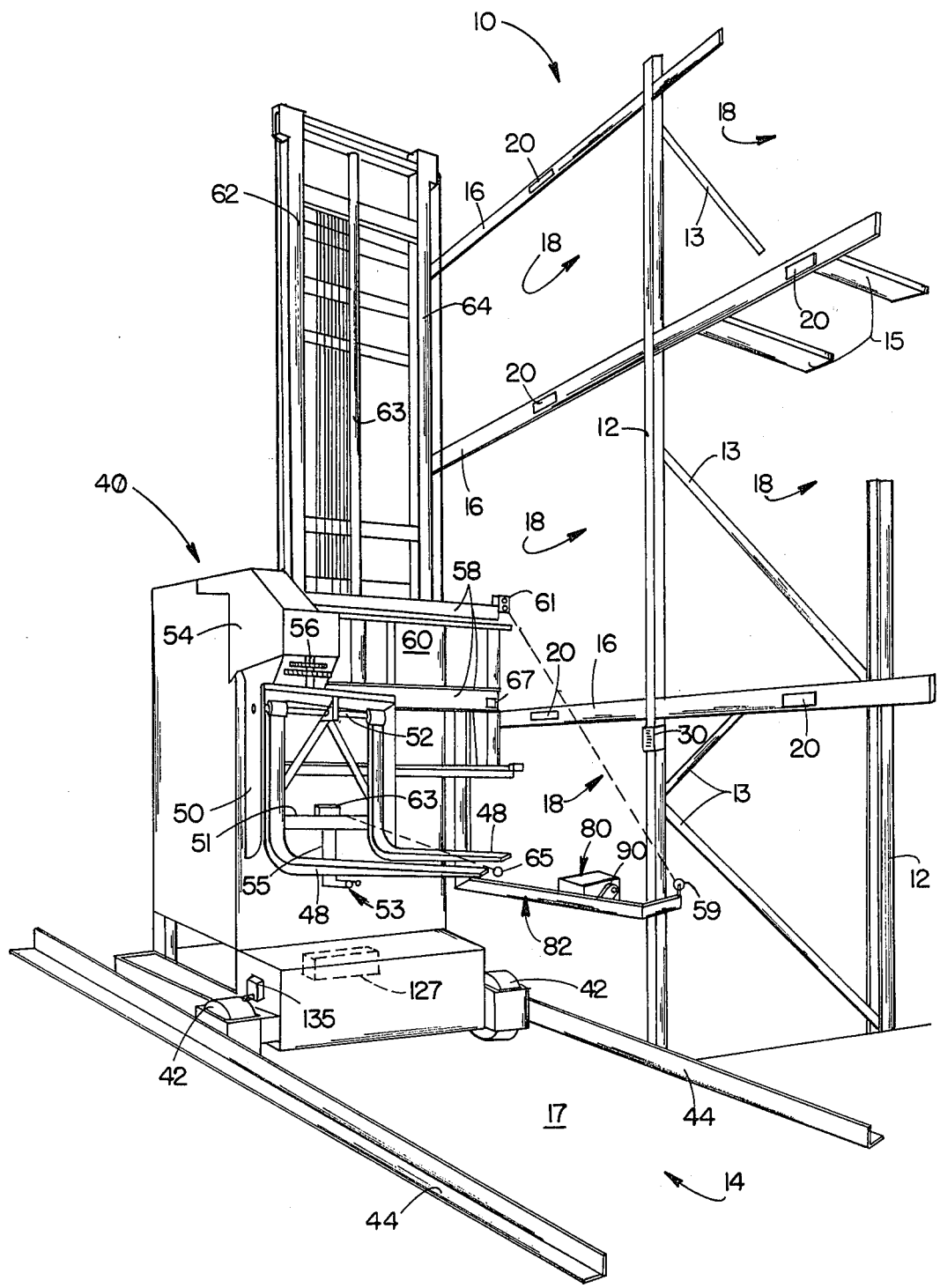
FIG. 1 is a fragmentary perspective view of a materials handling system embodying the present invention.

Referring initially to FIG. 1, there is shown a warehousing system embodying the present invention which includes a storage rack 10 including vertical support members 12 positioned at spaced intervals along an access aisle 14 extending along the face of the storage rack. Horizontal support members 16 extend between the vertical support members 12, and suitable cross frames 13 providing structural rigidity to the storage rack. The vertical and horizontal members 12 and 16 respectively and suitable floor supports 15 define a plurality of storage bins 18, which in the preferred embodiment, are divided into two storage locations, each having a width to receive a standard palletized load.

Positioned at a predetermined location in association with each storage location is target means 20, which in the preferred embodiment, comprises a rectangular block of retroreflective material adhered to the horizontal support member 16 of each of the storage bins at each storage location. The storage rack structure also includes, as seen in detail in FIG. 3, address indicating indicia 30 uniquely identifying each storage location of the system. As will be described more fully hereinafter, the position indicia are employed to coarsely position a palletized material handling vehicle 40 (FIG. 1) in the vicinity of a storage bin to which palletized loads are to be delivered or picked up.

Vehicle 40 is adapted to move along the floor 17 of the installation with its wheels 42 supported directly on the floor but captively held between a pair of horizontally spaced, parallel guide brackets 44 defining a captive path extending along the face of the storage rack 10 for movement of the vehicle along the storage rack structure.

Vehicle 40 is a commercially available Model No. 35, swing reach picking vehicle, manufactured by the Raymond Corporation with the control and sensing means of the present invention separately incorporated.

The vehicle 40 handles palletized loads by means of a pair of spaced forks 48 mounted to be vertically pivotable with respect to a U-shaped frame 50 by means of a pivot shaft 52. Frame 50 is, in turn, rotatably mounted to a first carriage 54 by means of a vertical axle 56, and motor drive means (not shown). Such construction permits the forks 48 to be rotated to the left or right side of the vehicle, such that the vehicle can service facing storage racks on either side of the access aisle.

The first carriage 54 is slidably positioned on a pair of vertically spaced, horizontally and laterally extending guide rails 58 such that the forks can also be extended into and out of a storage location. Rails 58 are secured to a vertically movable elevator 60 supported by the vertically extending frame members 62 and 64 of the vehicle and movable to position the forks 48 at a desired vertical level for access to any of the storage locations within the system. Hydraulic drive means including an elongated cylinder 63 controls elevator 60, while electrical drive motors are employed for propelling the vehicle along the access aisle to a desired location.

As best seen in FIGS. 1 and 2, sensing means 80 is positioned on the elevator 60 by means of a support frame 82 such that the sensing means will be fixed in relationship to the elevator and the forks 48 carried thereon as the vehicle moves from one location to another in the system. Sensing means 80 cooperates with the target means 20 to provide fine vertical and horizontal positioning of the vehicle within an access aisle with respect to a preselected storage location once the forks of the vehicle are positioned in general alignment with a desired storage location.

The sensing means 80 of the preferred embodiment, as best seen in FIG. 2, comprises a generally rectangular housing 81 having a face wall 83 which is inclined with respect to a plane parallel to the targets 20 at an angle of approximately 6° such that any extraneous light which may be reflected from the support members of the rack structure will not cause activation of the light detectors contained therein. Thus, only a level of light sufficiently high indicating that the sensing means is aligned with the reflective target means 20 of a bin is sufficient to activate the control circuit. Mounted within housing 81, adjacent face 83 are three light detecting means 84, 86 and 88 arranged in a triangular pattern with detectors 84 and 88 positioned in horizontal alignment with one another, and detector 86 positioned between detectors 84 and 88, and slightly below in triangular arrangement. Each of the detectors is integrally formed in a photoelectric detector and light source pair, each of which includes a light source associated with a particular light detector such that illumination is directed outwardly from sensing means 80 toward the face of the storage rack structure and reflected light from the target is detected.

In the preferred embodiment where the target means 20 comprise a rectangular, retroreflective strip having a vertical dimension of 3.6 inches and a horizontal dimension of 4.5 inches, the light detectors 84, 88 and 86 were arranged in an inverted triangle with the detectors 84 and 88 horizontally spaced at 4 inches and forming an angle of about 20° between a line intersecting them and a second line extending from each of them to the third detector 86. The height of the triangle so formed is 0.75 inches. Thus, as seen in connection with FIG. 5B described below, the light detectors are capable of falling wholly within the rectangular target means when the vehicle is positioned such that the forks precisely align with a storage location within the bin. Naturally, this requires the light sensing means 80 to be positioned with respect to the forks on the vehicle, such that when it is aligned with the target means, the forks are operative to transfer palletized loads into or out of the storage location. Since, in the preferred embodiment, the sensing means are positioned approximately centrally at the lower horizontal support member of each storage location, the sensing means 80 provides a convenient location for the mounting of a bin full sensor 90 (FIG. 2) which is mounted on a sidewall of housing 81 and includes a light source and photo detecting means such that the light source directs light upwardly toward a storage bin, and in the event an article is within the bin, a bin full signal is generated.

The sensing means 80 and target means 20 associated therewith, are employed for providing fine horizontal and vertical positioning of the vehicle with respect to a storage location. For purposes of providing coarse or general alignment of the vehicle with respect to a particular storage location in the horizontal and vertical directions, generally conventional control means are provided although as described more fully hereinafter, a unique fail-safe sensor checking and cross-checking method and circuits are employed in conjunction with the coarse horizontal control as well as the vehicle's load handling forks. For coarse vertical positioning, a vertical shaft encoder is provided and mounted to the vehicle and coupled to elevator 60 such that upon movement of the elevator from a reference location such as ground level, signals are generated which provide an indication of the height of the elevator and therefore the general positioning with respect to a storage bin. For purposes of providing general or coarse horizontal alignment, as well as for identifying a particular address to which the vehicle is to travel, the detectors shown in FIGS. 3 and 4 are employed.

As seen in FIG. 3, mounted to each of the vertical support members 12 of the storage rack structure is an address indicia or target 30 having a series of horizontally extending, vertically spaced retroreflective strips mounted on the elongated, rectangular surface thereof. The uppermost strip of reflective material on the address target 30 provides a centering strip for a pair of horizontally spaced photo detectors 102 and 104 each associated with readers 100F and 100R (FIG. 9) mounted to the vehicle in horizontally spaced relationship such that only one of the readers will be vertically aligned with a target 30 at a given instant as the vehicle travels along the access aisle. The remaining retroreflective strips or absence thereof on each target 30 define an eight bit digital address with seven bits carrying the address of a storage location and the remaining bit being a parity bit. These strips will align and be read by the eight photo detectors 105 when the vehicle has reached a specified location determined by counting the address targets as the vehicle travels along the aisle. Reader 100R, as seen in FIGS. 3 and 4, is mounted to a framework 106, in turn, mounted to the aft end of a beam 108 secured to the framework of the load transferring vehicle 40. Since the targets 30 are vertically fixed on the framework, member 108 is not mounted to the elevator but is vertically fixed to the vehicle. In the preferred embodiment, horizontally extending beam 108 includes a second reader 100F on its opposite or forward end, also positioned to read address targets 30 with the spacing between the two readers being selected such that only one of the readers will be aligned with a target at a given time when the vehicle is in an aligned position with one of the two storage locations of a storage bin as described more fully hereinafter with reference to FIG. 9. The electrical control system for providing both coarse and fine horizontal and vertical control of the picking vehicle is shown in FIG. 6 which is now described.

Figures 6, 7:
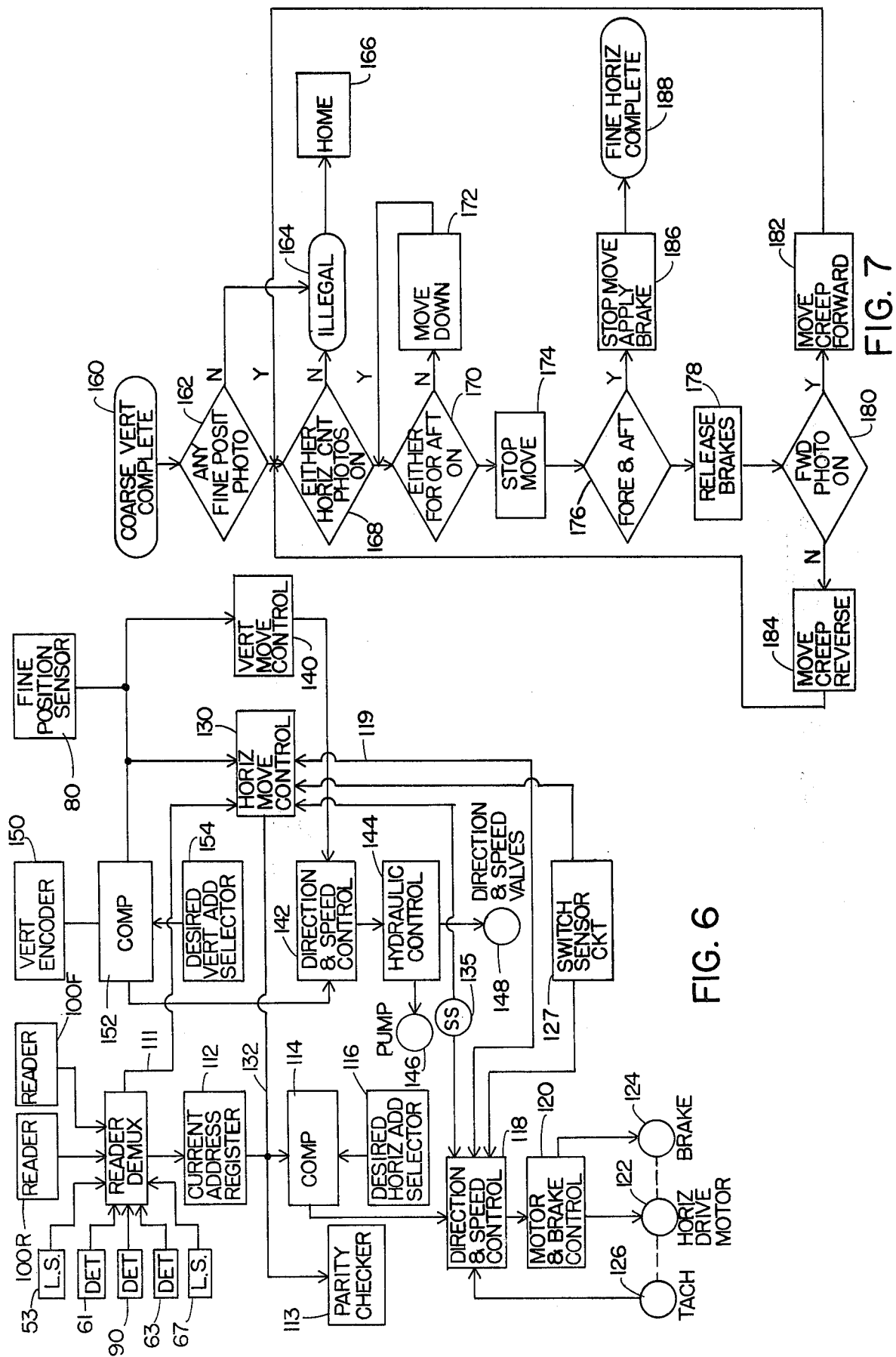
FIG. 6 is an electrical circuit diagram in block form of a control system employed in the system of the present invention.
FIG. 7 is a flow diagram of the horizontal fine positioning of the materials handling vehicle with respect to a storage location.

Referring now to FIG. 6 the address readers 100F and 100R are electrically coupled to a reader demultiplexer 110. The demultiplexer alternately couples the information detected by readers 100F and 100R to a current address register 112. Register 112 provides temporary storage of the address information read by the readers and applies the information to an 8 bit digital comparator 114. The comparator receives a preprogrammed desired horizontal address signal from an address selector circuit 116 which can take the form of a digital switch where manual operation of the picking vehicle is employed or can be incorporated in the programming of a microprocessor circuit where the system is incorporated in a computer control design. Circuit 116 provides digital signals to comparator 114 representative of a horizontal picking location to which the vehicle is to travel for the receipt of or deposit of palletized articles. The address register 112 is also coupled to a parity checking circuit 113 which is employed to make certain that an address is properly read. In the event parity is not detected, the movement of the vehicle to a predetermined address is aborted.

Figure 10:
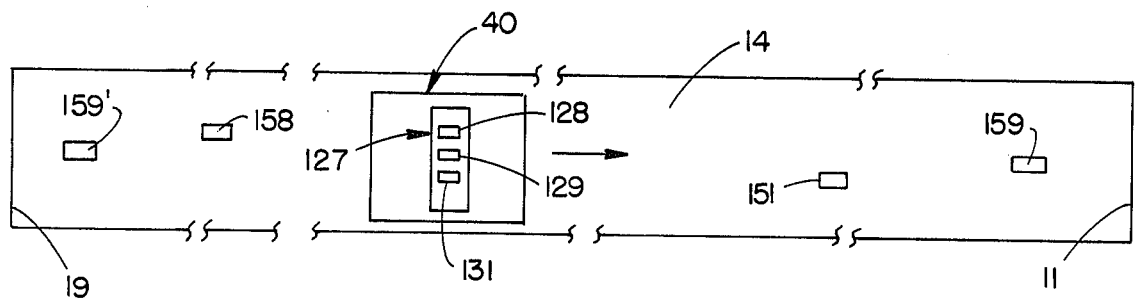
FIG. 10 is a fragmentary plan schematic view of an access aisle and vehicle therein.

So long as the current address read by one of the readers 100F or 100R and applied to comparator 114 does not correspond to the desired address, a vehicle control signal from comparator 114 is applied to a direction and speed control circuit 118 which, in turn, provides control output signals to a motor and brake control circuit 120. The motor and brake control circuit is coupled to a horizontal drive motor 122 and to an electrically operated brake 124 for controlling the motion and braking of the vehicle. Coupled to the motor drive is a speed tachometer 126 which has an output applied to an input of the direction speed control 118 to provide a closed loop feedback system for the speed control system. A speed sensor switch 135 is also coupled to circuit 118 and to a horizontal move control circuit 130. A switch sensor circuit 127 discussed below in conjunction with FIG. 10 is also coupled to circuits 118 and 130.

The information stored in the current address register 112 also includes information pertaining to the receipt of a centering signal from detectors 102 and 104 (FIG. 4) indicating whether or not the readers 100F and 100R are centered on the address target 30. These signals are applied to a horizontal motion control circuit 130 by means of a conductor 132. The horizontal motion control circuit 130 also receives signals from the fine position sensors 80, and switch 135, and circuits 118 and 127.

Sensors 80 are also coupled to a vertical movement control circuit 140 having its output coupled to a direction and speed control circuit 142 which provides control signals for a hydraulic control system 144 forming an integral part of the commercially available vehicle 40. The hydraulic control system 144 thus provides signals which are employed for actuating a hydraulic pump 146 and direction and speed controlling valves 148. The vertical direction and speed control circuit 142 also receives signals from a vertical shaft encoder 150 which as described above, provides signals which are applied to a digital comparator 152. Comparator 152 compares the actual vertical position as represented by signals from the vertical shaft encoder with the desired vertical position as represented by signals from a desired vertical address selector circuit 154. Circuit 154 like circuit 116 can be an integral part of a computer control system or can be a manually addressable circuit such as digital thumbwheel switches. Each of the circuits 100 to 154 are generally commercially available standard digital logic circuits with some of the circuits being incorporated in the commercially available vehicle itself. In the preferred embodiment of the invention, the circuitry employed for the coarse and fine vertical and horizontal control signal generation applied to the control circuits 118 and 142 and the sensor monitoring function was achieved by use of a microprocessor such as an Intel 8080A, and associated RAM and EPROM memory circuits. Suitable interface circuits are employed to interface the microprocessor with the sensors 80, 100F and 100R and to provide signals having a digital data format acceptable to circuits 118 and 142.

The coarse horizontal position is determined by a comparison of the programmed address with an address read by readers 100F and 100R and is described in detail in conjunction with FIGS. 11 and 12 below. Once the coarse horizontal position has been established, the vehicle stops at the column of bins to which it is programmed to travel and the vertical coarse positioning is achieved. This is accomplished by the hydraulic cylinder moving the elevator 60 with forks 48 whereupon to the desired storage location level. The vertical shaft encoder 150 provides signals to the comparator 152 which continues to drive the hydraulic control system 144 until such time as the signals from the encoder indicate that the proper bin level has been reached.

With the coarse horizontal and vertical positioning completed, the fine horizontal and vertical positioning is achieved by the cooperation of target means 20 and the sensing means 80 on the vehicle now described in conjunction with the flow diagrams of FIGS. 6 and 7. The horizontal fine positioning is achieved first followed by the fine vertical positioning and the flow diagrams of FIGS. 7 and 8 form the basis of the software programming for the microprocessor or the design of a hard wired solid state logic circuit which also could be employed to provide the desired control signals. Once the coarse positioning of the vehicle is complete, as indicated by block 160 in FIG. 7, circuit 130 first tests to ascertain if any of the three fine position light detectors 84, 86 or 88 are aligned with the target means 20. This test is indicated by block 162 in FIG. 7 and a positive response is illustrated in FIG. 5A where the fore sensor 84 is positioned on the target means 20. Normally at least one of the light detectors will be on target after coarse positioning. In the event none are, a signal from the control circuit 130 will indicate there is an illegal location as indicated by flow block 164 and provide an alarm indication to an operator who can then readdress the control system through, for example, a computer terminal, programming it to travel to a new address, attempt to have it move to the same address or have it returned to a home position as indicated by block 166. Assuming, however, the coarse positioning has been successful, the next test conducted by the control system is to ascertain as indicated by block 168, whether or not either of the horizontal centering photo detectors 102 and 104 (FIG. 4) are on the target 30. If not again, the illegal location routine indicated by blocks 164 and 166 are run.

If the test of block 168 is affirmative, the circuit tests to ascertain whether either the forward photo detectors 84 or the aft photo detectors 88 are on as indicated by block 170. As can be seen by reference to FIG. 5A, the vehicle could be positioned with the center and lower detector 86 on target 20 with the remaining detectors 84 and 88 above the target. If this is the case, the test of block 170 is negative and circuit 140 provides a vehicle control signal to direction and speed control circuit 142 to move the load handling elevator down solely as indicated by block 172 until such time as one of the forward or aft photo cells is aligned with the target, at which time the control system stops the movement as indicated by block 174.

Next the system tests to ascertain whether both the forward photo detectors 84 and aft detector 88 are aligned with the target as indicated by block 176. If not, the brakes 124 (FIG. 6) of the vehicle are released as indicated by block 178 and a test is conducted to ascertain whether or not the forward photo detector 84 is on as indicated by block 180. If the forward photo cell is on and the test from block 176 indicates the aft photo cell is not on, then it is desired to move the vehicle forward. This is accomplished as indicated by step 182 with circuit 130 applying a signal to circuit 118 causing the vehicle to move very slowly forward. Thus, as the vehicle moves forward slowly, the program or logic circuits cycle through the decisional loop including blocks 168 through 180 until the test of block 176 is satisfied. If the forward photo is not on, however, indicating that the vehicle is too far forward since the aft photo 88 is on the target, it is desired to move the vehicle in reverse slowly as indicated by block 184. Once both the forward and aft photos 84 and 88 are on target as indicated by block 176, a vehicle is positioned in the horizontal fine position and the drive motor 122 is deactivated and brake 124 applied as indicated by block 186 in FIG. 7. This completes the fine horizontal positioning as indicated by block 188 and the system then accomplishes the vertical fine positioning as illustrated by the flow diagram of FIG. 8 now described.

Naturally, when transferring loads into the system the forks 48 of the vehicle should be slightly above the floor level of the storage location such that the palletized load can be moved into the storage location without interference. This position is identified as a bin high position for purposes of transferring a load into the bin. When, however, it is desired to remove a palletized load from the storage bin, it is desired to have the forks in a bin low position such that they will extend into a pallet which then can be lifted off of the supporting floor of the storage location. Thus, the control system includes means for receiving and storing operator programmed information as to whether or not the vehicle is dropping off a palletized load or picking up a load from the storage location.

Assuming initially that it is desired to drop a palletized load from the materials handling vehicle into a storage bin, a bin high position is thus required. Once the fine horizontal positioning is complete as indicated by block 188, a test is made to ascertain whether or not a bin high position is commanded as indicated by block 190. If it has been, the circuit, as indicated by block 192, tests to ascertain whether or not the forward and aft detectors 84 and 88 respectively, are off. If they are, as indicated in phantom form in FIG. 5C, it indicates that the forks 48 of the materials handling vehicle are in the desired bin high position. If not, as for example, if the vehicle is centered as shown in FIG. 5B, the hydraulic pump 146 (FIG. 6) on the elevator mechanism is actuated as indicated by block 194 and the elevator moved slowly upwardly as indicated by block 196 until the detector position shown in phantom form in FIG. 5C is reached, at which time the movement is stopped as indicated by block 198 and pump 146 is turned off as indicated by block 200. In this position the load handling forks of the vehicle are in a bin high position as indicated by block 202 and the fine vertical alignment is completed as indicated by block 204. Subsequent to this fine positioning, the vehicle load transferring mechanism is actuated to extend the forks into the storage bin. The control system through circuit 140 then lowers the elevator 60 to the bin low position thus lowering the forks to transfer the load onto the storage location floor. The forks are then retracted from the storage location whereupon additional load transferring functions can be carried out. This fork control cycle is indicated in FIG. 8 by block 205.

If however, it is desired to pick up an article from storage, a bin low position is desired and the command will be tested by block 190 to ascertain this fact and first the center detector 86 is checked (block 206) to ascertain whether it is an alignment with target means 20. If it is not, as indicated in solid lines in FIG. 5C, this indicates a bin low position in which the fore and aft cells are aligned but the center photo cell is not aligned with the target means. Thus, as indicated by block 206, if the center photo cell is aligned, the control is actuated to gradually lower the elevator as indicated by block 208 until such time as the center detector 86 is off. At this time the pump is deactivated and the elevator stopped as indicated by block 210 and the bin low position as indicated by 212 is achieved, which completes the fine vertical alignment, after which the forks and elevator are actuated to extend the forks into a pallet, lift the pallet by moving the elevator to the bin high position, and remove it from the storage location as indicated by block 205. If desired in the preferred embodiment where the system is controlled by a microprocessor, the vertical position can be continuously checked by completing the loop between the output of block 204 and the input of decision block 190 such that the desired position can be continuously monitored and maintained until the load transfer takes place.

Having described the control of vehicle 40 to achieve load transferring functions in a warehousing system the sensor monitoring and control system of the preferred embodiment of the invention which is incorporated with vehicle 40 is now described in detail with reference to FIGS. 1, and 9–12.

Figure 9:
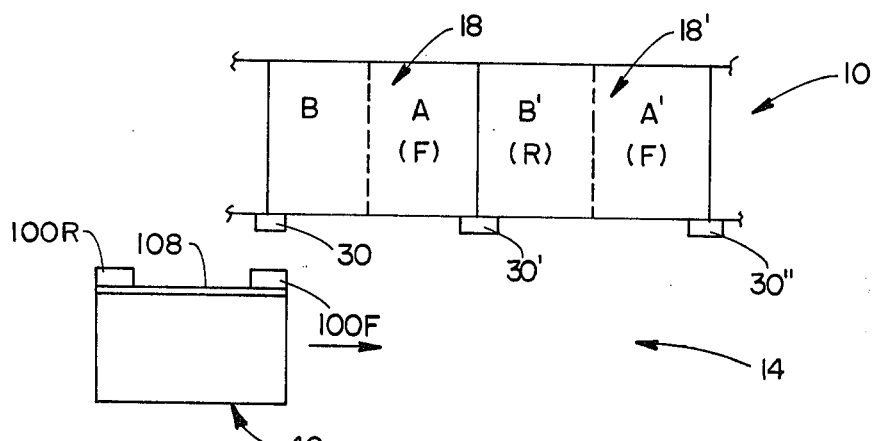
FIG. 9 is a fragmentary plan schematic view of a vehicle and its address detectors shown in relationship to address indicia on the storage racks of the system.

Referring initially to FIG. 9, there is shown pictorally the packing vehicle 40 moving along the face of a storage rack 10 such that the forward reader 100F first aligns with an address indicia or target 30 on the storage bin rack as also shown in FIG. 1. Subsequently in time spaced relationship as the vehicle 40 moves along the aisle, the rear reader 100R will read the same target 30. As sensor 100F reads target 30, the address for the A storage portion of the first bin 18 is read. As the vehicle 40 proceeds down the aisle, and reader 100R reads target 30, the storage location B' corresponding to the second bin 18' is read by the alignment of sensor 100R with target 30. The next target 30' is then read by sensor 100F to identify the address corresponding to storage location A' in the second storage bin 18' followed by the same address being read by sensor 100R corresponding to the first storage location in the next storage bin (not shown). The horizontal spacing of sensors 100F and 100R is significantly less than the spacing of adjacent targets 30–30', 30'–30" such that the fore and aft readers 100F and 100R will never be simultaneously aligned with these adjacent targets. In order to assure the operation of the detectors, and particularly to detect against shorts in the detectors, wiring failures or the like, the fact that the detectors are never simultaneously aligned with a pair of adjacent targets is employed. The reader demultiplexer 100 (FIG. 6) thereby continuously monitors the photoelectric detectors 102 and 104 (FIG. 4) included in each of the sensors 100F and 100R to ascertain whether or not these sensors are simultaneously detecting a target. If they are, this indicates a physically impossible condition and therefore an electrical failure and a fault control signal is developed by the horizontal move control circuit 130 coupled to circuit 110 by conductor 111 to cause the vehicle to stop until such time as the failure can be corrected. The logic sequence involved in this test is disclosed as block 238 of FIG. 11 which is described in greater detail in conjunction with the vehicle speed control system shown in FIG. 10 now described.

In FIG. 10 one of the aisles 14 of the warehouse is shown pictorially. Each aisle provides the access for a vehicle 40 between storage racks on opposite sides (not shown). Embedded in the floor of each of the aisles approximately five bins away from the forward end 11 and the rear end 19 of the aisle 14 are ceramic magnets to react with magnetic proximity switches contained on the vehicle 40 for controlling the speed of the vehicle as it approaches an aisle end. Thus, the vehicle includes a switch sensing circuit 127 which includes a reverse slow down, magnetically actuated switch 128, a creep speed, magnetically actuated switch 129, and a forward slow down, magnetically actuated switch 131. The switches 128, 129 and 131 and circuit 127 are mounted to the approximate center of vehicle 40 near the surface of the aisle as shown schematically in FIGS. 1 and 10 such that the magnets will be effective in changing the switch states as the vehicle passes over the magnets. Switch 131 on vehicle 40 is aligned with a magnet 151 located five bins away from the forward end 11 of the storage system such that as the vehicle 40 travels over the switch 151, switch 131 will be actuated thereby and, as shown in FIG. 6, circuit 127 including switch 131 will generate a signal applied to the motor and brake control circuit 120 for slowing the vehicle to an intermediate speed. Circuit 127 is also coupled to the horizontal move control circuit 130, which responds to a failure control signal to provide a vehicle stop control signal to circuit 118 in the event of a failure. As the vehicle approaches the forward end 11 of the aisle, the creep sensor switch 129 aligns with and is actuated by a magnet 159 buried approximately one bin away from the aisle end to provide a further speed reduction control signal such that the vehicle is slowed to a creep speed, such that it can easily stop at the end of the aisle.

The reverse end 19 of the aisle also includes a creep actuating magnet 159' which actuates switch 129 when the vehicle is moving in a reverse direction and an intermediate reverse speed magnet 158 which actuates switch 128 as the vehicle approaches five bins from the aisle end for slowing the vehicle to an intermediate speed. This detection and speed control circuit is conventional but is subject to mechanical failure of the magnetic proximity detecting switches 128, 129 and 131 or electrical failures. In order to check the operational status of the switches, circuit 127 checks the simultaneous status of each of switches 128, 129 and 131 which, when not activated by a magnet, are closed, thereby providing a logic 1 signal. Thus, at mid-aisle position the signals from switches 128, 129 and 131 will provide a 1,1,1, output signal. As the vehicle reaches switch 151 moving in a forward direction, the output signal will be a 1,1,0 signal and as it approaches switch 159, the output will be a 1,0,0 signal. Conversely, as the vehicle moves toward the reverse end of the aisle 14, the switches will provide a 0,1,1 signal as switch 128 is activated by magnet 158 and subsequently a 0,0,1 signal as switch 131 is actuated by magnet 159'. These are the normal operating conditions for the three switches, and the only condition which is abnormal, therefore, is the logic status 1,0,1 which is an error condition which should not occur during normal operation. Circuit 127 includes suitable conventional logic circuitry for detecting this error status condition of switches 128, 129 and 131 and providing an error control signal to circuit 130 in the event such condition is detected. Circuit 130 responds to such a signal to provide a stop control signal applied to the motor control circuit 120 through circuit 118, stopping the movement of the vehicle until the failure can be corrected. Typical failures which can be detected by the circuit include a stuck-open creep sensor switch, a missed sensing magnet, switches 128 and 131 being stuck closed, or open or shorted interconnecting wires within the system.

The integration of the sensor fault monitoring method and structure shown in FIGS. 9 and 10 with the course horizontal movement control of the vehicle 40 along an aisle 14 is explained in connection with the flow diagram of FIG. 11, now described.

Figure 11:
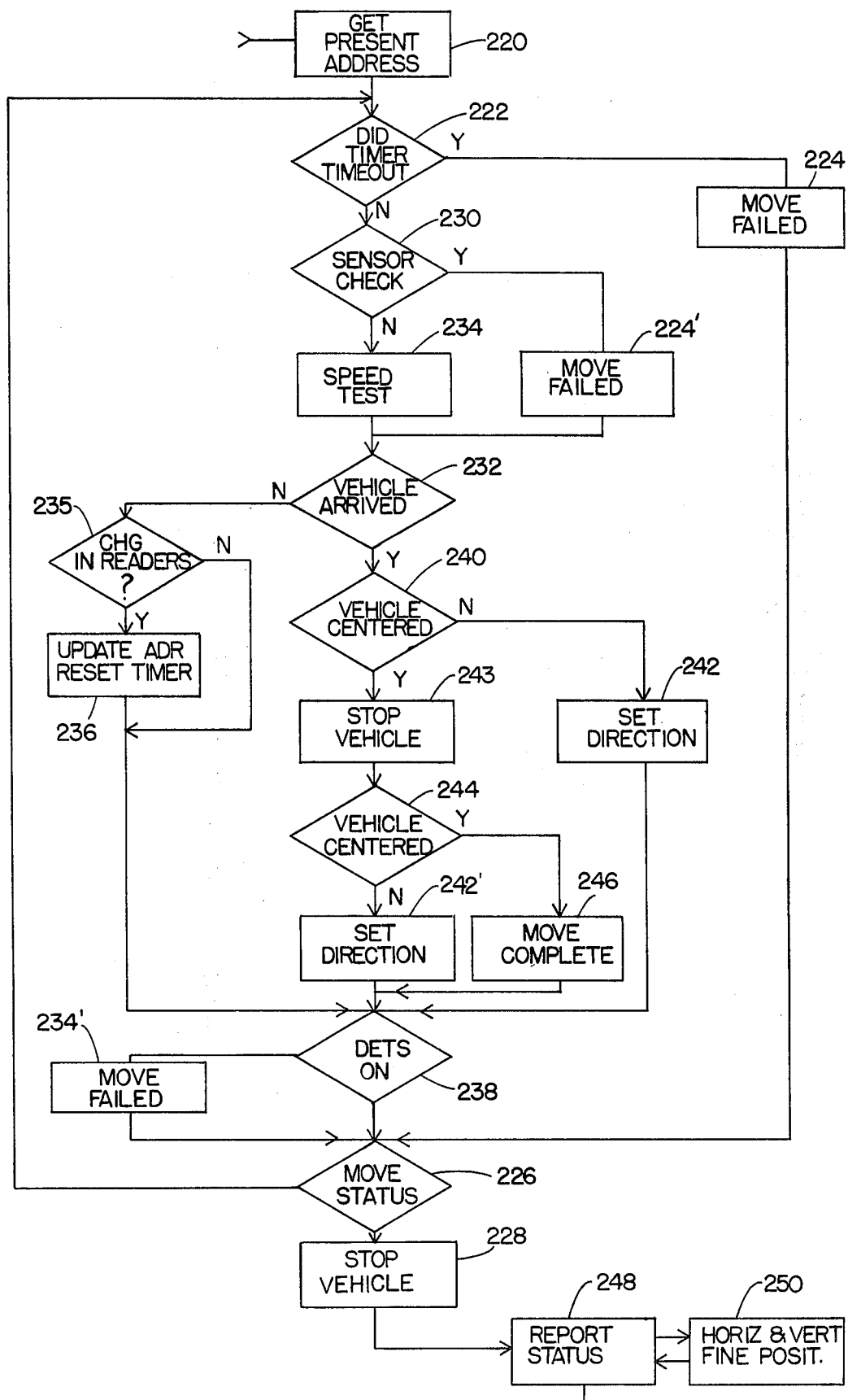
FIG. 11 is a flow diagram of the horizontal coarse positioning of the materials handling vehicle.
Figure 12:
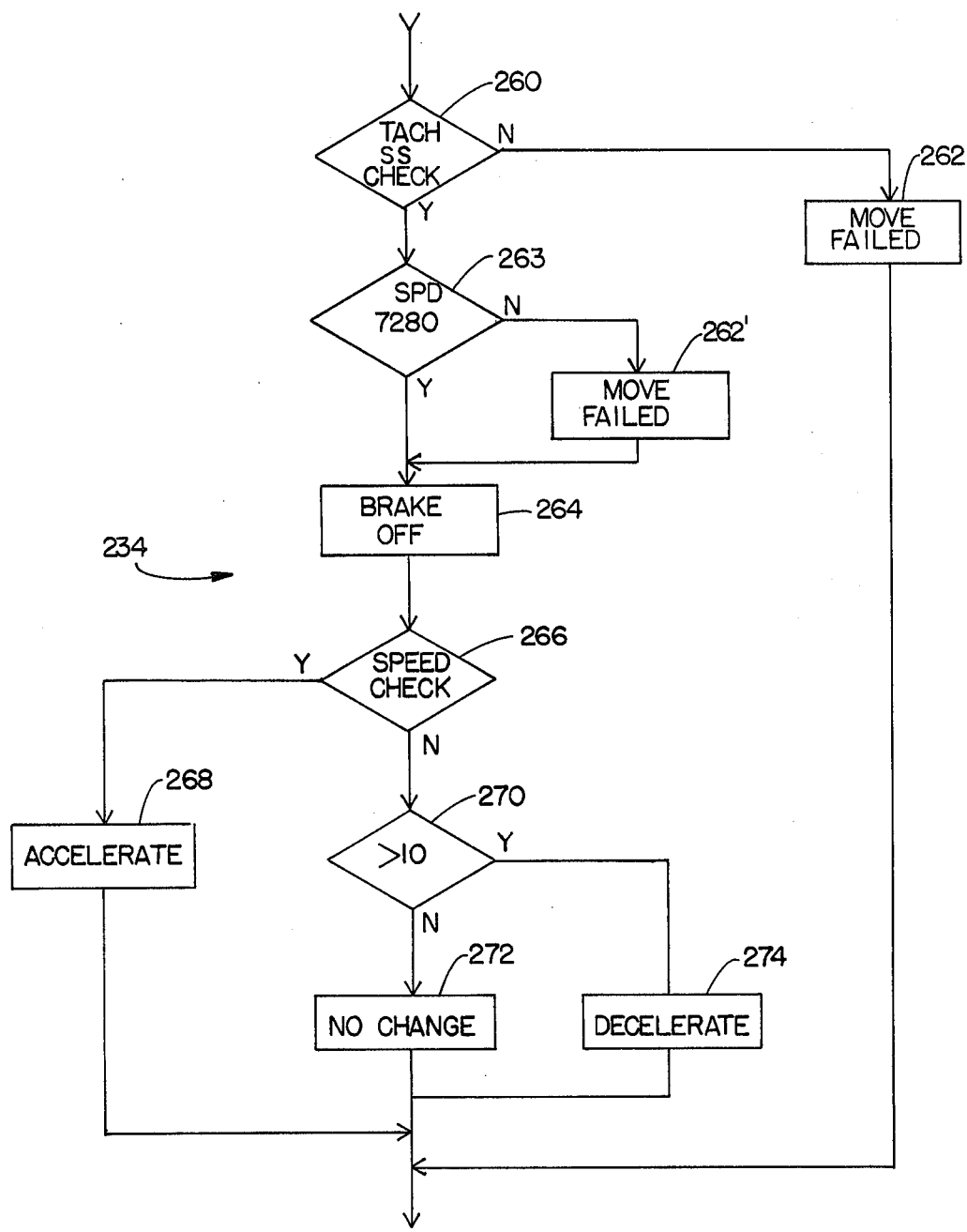
FIG. 12 is a detailed flow diagram of a portion of the vehicle control flow diagram shown in FIG. 11.

FIG. 11 represents a logic flow chart for the logic circuits contained within the circuits of FIG. 6 or the software programming for a microprocessor which includes, as part of its circuitry, circuit 130, depending upon the desired construction of the control system. In FIG. 11, the current location of the vehicle 40 is determined as indicated by block 220 from readers 100F and 100R and a ten-second timer included in circuit 110 is set. Next, the timer is checked as indicated by block 222 to ascertain whether it has timed out. If it has, that indicates the vehicle has not moved and a moved failed flag 224 is set and applied to a move failed detection circuit as indicated by block 226. In this event, a stop vehicle signal as indicated by block 228 is applied to circuit 120 by the interconnection of circuit 130 to 118 (FIG. 6). If, however, the timer has not timed out, circuit 127 is checked to ascertain whether or not the sensors 128, 129 and 131 are operating properly as indicated by block 230. If a sensor failure (i.e., a 1,0,1 condition) is detected, a moved failed flag is generated as indicated by block 224' and the control sequence proceeds to ascertain whether or not the vehicle has reached its destination as indicated by block 232. If, however, no failure of conditions are detected, a speed control test as indicated by block 234 and described in greater detail below in connection with FIG. 12 is conducted. Assuming the speed test has verified the proper operation of the vehicle, the vehicle destination check 232 is conducted to ascertain if it has arrived at its programmed address. This is accomplished by comparator 114 (FIG. 6) as described earlier. If the vehicle has not arrived at its destination, the test indicated by block 235 is run to ascertain whether or not the vehicle is moving by detecting changes in horizontal reader 100F and 100R outputs. If no changes are detected the logic sequence proceeds to determine whether or not both horizontal readers have sensors 102 or 104 (FIG. 4) on, as indicated by block 238. If, however, the test 235 indicates a change in detected addresses, the current address read by sensors 100F and 100R is updated and the ten-second timer is reset as indicated by block 236 indicating that the vehicle is moving in a normal fashion.

When the vehicle has arrived at its destination as indicated by the yes output of block 232, sensors 102 and 104 are checked to ascertain whether the vehicle is centered as indicated by block 240. If it is not centered, depending upon the status of sensors 102 and 104, a direction control signal as indicated by block 242 is provided by circuit 130, which applies a signal to control circuit 118 to either move the vehicle slightly forwardly or reversely to center the vehicle. If, however, the vehicle is centered as indicated by a yes decision at block 240, the vehicle is stopped for a wait period of one-half of a second as indicated by block 243 and sensors 102 and 104 are again checked as indicated by block 244 to ascertain whether it is still centered. If it remains centered and, therefore, is not continuing to move, a move completed flag is set as indicated by block 246 indicating it has reached its desired address. If, however, the vehicle has for one reason or another continued moving, as indicated by a no decision on block 244, the direction of the vehicle is controlled as indicated by block 242' to move it slightly forwardly or in a reverse fashion. At this time as indicated by block 238, the reader cross checking step which was discussed in reference to FIG. 9 above reads the centering photos 102 and 104 associated with reader 100F and 100R to ascertain whether or not the sensors are operating properly. If signals are provided by both of the fore and aft readers, a move failed flag 234' is set.

At this time, either the vehicle has stopped at its desired address or a failure of one type or another has occurred. A test indicated by block 226 is run to ascertain which of the two cases exist and if neither, it indicated that the vehicle is still in motion and the logic sequence is repeated by testing whether or not the timer has run out as indicated by block 222. If the move was completed or a failure occurred, the vehicle is stopped as indicated by block 228 and the current address information is checked with the present address information as indicated by block 248. If the current address corresponds to the desired address initially requested for a transfer of an article to or from a storage location, the fine horizontal and vertical control as set forth and described in conjunction with FIGS. 7 and 8 is then conducted as broadly indicated by block 250 in FIG. 11. If not, the cycle is repeated beginning with block 220 until the vehicle has arrived at its programmed destination.

The vehicle control system shown in FIG. 6 also includes a speed sensor switch 135 (also shown in FIG. 1) which provides a binary 1 or 0 output signal and which changes state at approximately 250 feet per minute. The normal operating range of the vehicle is between 0 and 500 feet per minute, thus, as the vehicle passes through the 250 feet per minute range, the switch goes from a closed state (1) to an open state (0) thereby providing redundant information in addition to the speed tachometer 126 as to this particular speed. The sensor switch 136 is employed in connection with the horizontal move control circuit 130 and the end of aisle sensing circuit 127 to provide a failure control signal to stop the vehicle in the event for example, the vehicle crosses one of the creep sensor switch actuators 159 or 159' actuating switch 129 and the speed sensor switch indicates the vehicle is travelling in excess of 250 feet per minute. This condition indicates that the vehicle cannot under its normal control, come to a stop before the end of the aisle and an emergency braking system through the motor control and brake circuit 120 is actuated to assure stopping of the vehicle.

In order to monitor the proper operation of the speed sensor switch 135 and therefore assure its functioning, its state of activation is checked at 150 feet per minute and 290 feet per minute where it normally should be in a closed and open state respectively. This is done by logic included in circuit 130 which is now described in conjunction with FIG. 12 which is a detail of block 234 shown also in FIG. 11. When the output of tachometer 126 coupled to horizontal move control 130 (FIG. 6) through the direction speed control circuit 118 and data link 119 indicates the vehicle is travelling at 150 feet per minute, as indicated by block 260 in FIG. 12, the actuation state of the speed switch 135 is checked. At this time it should be in a closed state providing a binary 1 signal to the logic of circuit 130. If it is not closed, a moved failed flag, as indicated by block 262, is set and supplied to the control system at block 232 shown in FIG. 11 to stop the vehicle movement. Similarly, when the tachometer indicates the vehicle is travelling at approximately 290 feet per minute, the state of the speed sensor switch 135 is tested to ascertain whether it is open thereby providing a logic 0. If not, again the moved failed flag, as indicated by block 262, is set and the vehicle operation terminated. If the tests indicate switch 135 is in the correct state for the given speed, the logic circuit tests, as indicated by block 263, as to whether or not there is a difference in speed greater than approximately 280 feet per minute between tach speed and desired speed. If the speed difference is greater than this amount then the vehicle is either travelling much too fast or too slow and again the moved failed flag indicated by block 262' is set. The brake is released as indicated by block 264 and a check is made by block 266 to test if the desired operational speed is greater than the actual speed. The desired operational speed naturally depends upon what part of the aisle the vehicle is traversing as well as the proximity to the desired address for transfer of a load. If the speed is too low, the control circuit accelerates the vehicle in the desired direction as indicated by block 268. If the difference in the desired speed from the actual speed is within 10 feet per minute, no speed change is required as indicated by block 272. If, however, the speed difference is greater than 10 feet per minute indicating the vehicle is travelling too fast, as indicated by block 274, the vehicle speed is decelerated. The coarse horizontal vehicle movement then continues as indicated by block 232 of FIG. 11.

In addition to the several sensor cross checking circuits to assure safe and accurate movement of the vehicle 40 along an aisle 14 when travelling to a desired address, several sensors and cross checking circuits are provided with respect to the transfer of palletized loads by the forks 48 themselves. The first of these involves the rack face limit switch 53 (FIG. 1) which is mounted on a downwardly extending boom 55, in turn, coupled to a cross support 51 secured to fork frame 50. Switch 53 is normally open but engages the cross member 16 of a bin when the forks 48 are fully extended into the bin for the transfer of a palletized load therebetween.

Switch 53 is monitored by circuit 110 when forks 48 are in a travelling position and the vehicle moving and therefore the switch should be in an open position. In the event the switch is closed, a limit switch failure signal is provided by circuit 130 indicating a failure in this portion of the control system.

In addition, the vehicle 40 includes an overhung load sensor mounted to the frame of the vehicle as shown in FIG. 1 and includes a light transmitter and photo detector 61 for focusing light on a target 59 mounted at the end of beam 82. In the event a palletized load is hanging over the side of the forks, the return beam from reflective target 59 will be interrupted providing a control signal to the operator that an abnormal condition exists. The beam will always be interrupted when the forks are extended fully into a storage bin for the transfer of palletized loads and therefore during such time, the signal from detector 51 is monitored by circuits 110 and 130 to ascertain if the beam is interrupted and the signal output therefrom so indicates. If not, detector circuit 51 has failed and a fault control signal is generated which can be employed to stop the vehicle and/or provide a suitable operator altering alarm.

The bin full sensor 90 (FIG. 2) is employed to provide a control signal used to abort an unloading transfer to an occupied storage bin. The operational status of the bin full sensor 90 shown is cross-checked by a load-on-board sensor system comprising a photo optical transmitter receiver unit 63 mounted on cross member 51 associated with fork frame 50 (FIG. 1). A target 65 is mounted to the end of forks 48 such that a load positioned on the forks will interrupt the light beam shown in dotted lines in FIG. 1 indicating a load is present on the forks. With the forks fully extended into a storage bin and a load present on the forks, the load-on-board sensor 63 will indicate a load present on the forks. At the same time, sensor 90 shown in FIG. 2 will always indicate during a picking operation that the bin is full and therefore a palletized load is in position on the forks. Thus, the signals from circuit 63 are compared with those from detector 90 and if they do not both confirm the existance of a load on the forks while the forks are extended into the bin, a failure signal is provided indicating failure of the bin full sensor 90.

Finally, mounted to opposite ends of the fork carriage 58 are a pair of left and right limit switches 67 (FIG. 1) only one of which can be engaged for any position of the fork carriage. These limit switches are monitored through circuit 110 and logic within circuit 130 and if both switches are simultaneously closed, a failure signal is generated indicating failure of one of these two controlling switches.

Thus, the system of the present invention assures fail safe operation of the vehicle by monitoring the status of the vehicles sensors during a portion of a load transferring cycle when the state of the sensor is known and in some instances by cross-checking sensors in a correlative fashion where the operational status of the sensors have a predetermined relationship to one another.

The individual circuit components (FIG. 6) can, as indicated by the flow diagrams of FIGS. 7, 8, 11 and 12, be relatively elemental logic circuits. Thus for example, the testing of detectors 84, 86 and 88 can comprise OR gates, AND gates and the like, depending upon the decisional process required. For decisional block 192 of FIG. 8, the output signals from detectors 84 and 88 can be applied to a NAND gate to provide the desired control signal. Similarly, an OR gate can be employed to achieve the decision making function indicated by block 170 in FIG. 7. Thus, the system will permit application of the coarse and fine vertical and horizontal positioning to a control system employing a relatively uncomplicated logic circuitry. Alternatively, as in the referred embodiment, an overall microprocessor control system can be employed where the software programming is written in accordance with the flow diagrams of FIGS. 7, 8, 11 and 12. Naturally, where vehicle 40 serves both sides of an aisle, second sensing means 80 will be employed facing the opposite side of the aisle from sensor 80 shown in FIG. 1.

The system incorporating this invention can be employed for a variety of uses an it will become apparent to those skilled in the art that various modifications to the preferred embodiment of the invention described herein can be made without departing from the spirit or scope of the invention as defined by the appended claims.

The embodiments of the invention in which an exclusive property or privilege is claimed are defined as follows:

1. A system for checking the operation of one or more sensors used for controlling a vehicle employed for transferring articles into or out of storage locations of a warehousing system comprising:
    first sensing means associated with the vehicle for providing signals employed in controlling the vehicle during a load transferring cycle of operation and which has a predictable operational status when detecting a predetermined condition normally encountered during a selected portion of each load transferring cycle of operation;
    monitoring circuit means coupled to said first sensing means for determining the operational status of said first sensing means during said selected portion of each load transferring cycle of operation and for generating a fault control signal in the event the status of said first sensing means indicates that the predetermined condition is not sensed;
    control circuit means coupled to said first sensing means and responsive to signals therefrom for providing vehicle controlling signals; and
    second sensing means which provides a predetermined output signal during said selected portion of each load transferring cycle of operation and logic circuit means coupled to said first sensing means and to said second sensing means to provide a fault control signal in the event that the predictable operational status of said first sensing means does not occur in the desired relationship to said predetermined output signal from said second sensing means.

2. The system as defined in claim 1 wherein said vehicle includes load handling means extendable into and out of a storage location of the warehousing system for transferring articles between the vehicle and a storage location and wherein said first sensing means comprises an overhung load sensor for detecting the presence of an article extending laterally to a side of the vehicle an excessive amount, said overhung load sensor providing a predictable operational status when said load handling means are extended into a storage location.

3. The system as defined in claim 2 wherein said second sensing means comprises a switch which engages the frame forming the storage location when said load handling means are extended into the storage location to provide a predetermined output signal.

4. The system as defined in claim 1 wherein said vehicle includes load handling means extendable into and out of a storage location of the warehousing system for transferring articles between the vehicle and a storage location and wherein said first sensing means comprises a storage location full sensor for detecting the presence of an article in a storage location and employed for preventing the extension of a loaded load handling means into a full bin and wherein the operational status of said storage location full sensor is checked when picking an article from a storage location and therefore the storage location will have an article therein which actuates said storage location full sensor; and wherein said second sensing means comprises an article on-board sensor associated with said load handling means for detecting the presence of an article on said load handling means.

5. The system as defined in claim 1 wherein said vehicle includes load handling means extendable from side to side on said vehicle and means movably supporting said load handling means along a laterally extending track, said first and second sensing means comprises switch means located at opposite ends of said track for providing control signals indicating when said load handling means are at one side or the other of said vehicle during a load transferring function, and wherein only one of said switch means are actuated when said load handling means are centered for vehicle travel, and wherein said monitoring circuit means determines that only one of said switch means are actuated during vehicle motion.

6. The system as defined in claim 1 in which said first and second sensing means comprises a pair of address reading sensors positioned on said vehicle in spaced relationship such that as the vehicle moves along an access aisle of the warehouse system each sensor will successively detect an address indicia associated with the warehouse storage locations and wherein said monitor circuit is coupled to said address sensors to determine if both sensors simultaneously detect an address indicia and provide said fault control signal in the event of such detection.

7. The system as defined in claim 1 wherein said first and second sensing means comprise a plurality of sensors positioned on said vehicle to be actuated by actuators near the ends of access aisles in the warehousing system for controlling the vehicle speed near the aisle ends and wherein said monitoring circuit is coupled to each of said plurality of sensors to test for an abnormal combination of sensor states and provide a fault control signal in the event an abnormal combination is detected.

8. A method of testing the operation of a vehicle controlling sensor of a warehousing vehicle employed for transferring articles into and out of storage locations and providing a fault control signal output if an abnormal condition exists comprising:

monitoring the operational status of a pair of functionally related sensors against each other during a portion of each load transferring cycle in which each sensor has a predictable operational status with respect to the other sensor of the pair; and providing a fault control output signal in response to sensor output signals not corresponding to the predictable outputs.

9. In a system for controlling the alignment of an article handling vehicle which traverses an access aisle of a storage system, a detection system which detects storage location address indicia on the framework defining the storage locations of the system comprising:

a pair of detectors positioned on the vehicle to successively scan address indicia spaced at pre-determined intervals of the storage system as the vehicle travels along an access aisle, said detectors spaced from one another a distance to assure that both detectors will not be simultaneously aligned with a pair of adjacent indicia; and circuit means coupled to said detectors for providing a fault control signal in the event signals from said detectors indicate simultaneous alignment with indicia thereby indicating a system failure.

10. In a warehousing system in which a load handling vehicle travels along an access aisle which includes actuators along the aisle and vehicle sensors responsive to the actuators for limiting and controlling the speed of the vehicle as it approaches an aisle end, a safety circuit comprising:

monitor circuit means coupled to said sensors for monitoring the status of the vehicle sensors and for providing a fault control signal if an abnormal combination of sensor states exists;

vehicle control circuit means coupled to said monitor circuit means and responsive to the fault control signal to stop the vehicle upon receipt of said fault control signal; and wherein said sensors include two detectors which detect forward and reverse vehicle intermediate speed actuators spaced a first predetermined distance from opposite ends of an aisle for slowing the vehicle as it approaches an aisle end.

11. The system as defined in claim 10 wherein said monitor circuit means provides a fault control signal in the event both of said intermediate speed detectors are actuated.

12. The system as defined in claim 11 wherein said sensors include an additional detector which detects vehicle creep speed actuators spaced a second predetermined distance from opposite ends of an aisle, said second predetermined distance being less than said first predetermined distance.

13. In a vehicle control system in which a speed tachometer is employed to control the speed of the vehicle, and a speed actuated safety switch is provided to provide a vehicle control signal in the event the vehicle is moving at an excessive speed near an aisle end of a warehousing system, a system for providing a test of the operational status of the speed actuated switch comprising:

a speed actuated switch set to change from a first state to a second state at a predetermined vehicle speed; and a monitor circuit coupled to said speed switch and to said speed tachometer for testing the state of said speed switch when said tachometer indicates the vehicle is below and above said predetermined speed to ascertain whether or not said speed switch is in said first or second states respectively, and for providing a fault control signal for stopping said vehicle in the event the proper switch state is not detected.

14. A system for controlling the alignment of an article transporting vehicle with respect to storage locations of an article storage system comprising:

a storage structure for receiving and storing articles, said structure including a framework of vertical and horizontal support members defining an array of storage locations;

target means positioned at a predetermined location with respect to each storage location;

an article transporting vehicle including drive means for moving said vehicle to any of the storage locations in said storage structure, said vehicle including target sensing means having three detectors positioned in a triangular pattern and responsive to the alignment of said detectors with said target means to provide predetermined control signals therefrom;

at least one sensing means associated with the vehicle for providing signals employed in controlling the vehicle during a load transferring cycle of operation and which has a predictable operational status when detecting a predetermined condition normally encountered during a selected portion of each load transferring cycle of operation;

monitoring circuit means coupled to said at least one sensing means for determining the operational status of said at least one sensing means during said selected portion of each load transferring cycle of operation and for generating a fault control signal in the event the status of said at least one sensing means indicates that the predetermined condition is not sensed; and control circuit means coupled to said target sensing means and to said at least one sensing means and responsive to said control signals therefrom to provide vehicle control signals applied to said drive means for actuating said drive means to position said vehicle in alignment with a storage location for the transfer of articles between said vehicle and said storage location.

* * * * *